United States Patent [19]
Stoffel et al.

[11] Patent Number: 4,585,331
[45] Date of Patent: Apr. 29, 1986

[54] OPTICAL SCANNING SYSTEM UTILIZING LINEAR DRIVE MOTORS

[75] Inventors: James G. Stoffel, Rochester; William L. Statt, Webster; Jacob N. Kluger, Rochester; Lawrence J. Mason, Penfield; Richard G. Ermer, Rochester, all of N.Y.

[73] Assignee: Xerox Corporation, Stamford, Conn.

[21] Appl. No.: 642,272

[22] Filed: Aug. 20, 1984

[51] Int. Cl.[4] .................... G03G 15/28; G03G 15/30
[52] U.S. Cl. ............................. 355/8; 355/3 R; 355/14 R
[58] Field of Search ............... 355/8, 3 R, 14 R; 318/135

[56] References Cited

U.S. PATENT DOCUMENTS 4,494,866 1/1985 Rattin et al. .................... 355/8

FOREIGN PATENT DOCUMENTS 54-76142 6/1979 Japan .
55-22770 2/1980 Japan .
0029853 3/1980 Japan .................... 355/8

Primary Examiner—Arthur T. Grimley
Assistant Examiner—David Warren
Attorney, Agent, or Firm—Joseph R. Sakmyster

[57] ABSTRACT

An optical scanning and illumination arrangement is provided for a document reproduction machine which includes a plurality of linear motors to drive the moving scan/illumination carriages. Each linear motor is under the control of a digital control circuit which, in turn, is under the control of a supervising circuit which maintains the status of machine operation and generates appropriate signals to control the individual digital control circuits.

5 Claims, 7 Drawing Figures

OPTICAL SCANNING SYSTEM UTILIZING LINEAR DRIVE MOTORS

BACKGROUND

This invention relates generally to electrophotographic reproduction devices and, more particularly, to an optical system for such a device which scans a document at an object plane and transmits the image to a moving photoconductive surface.

Conventional scanning systems for scanning a document placed on a transparent platen are exemplified by the system disclosed in U.S. Pat. No. 4,332,460. Typically, a photoreceptor drum or belt is driven in a desired direction, and at a desired speed, by an ac or dc drive motor via an associated main drive shaft. The rotary motion of the main drive shaft is transmitted into a lateral motion via a system of cables, capstans, pulleys and clutches, the lateral motion being then applied to the various optical components such as scanning mirrors and lamps generally via a carriage upon which the components are mounted. Each optical component, such as a full-rate or half-rate scan mirror, can be driven at separate rates of speed by selection of appropriate pulley diameters and cable lengths. The scan system then goes through cycles of document scan and rescan motions. During the scan cycle, each carriage is driven at a fixed speed ratio relative to the photoreceptor. For rescan, the drive direction is reversed and the scan components are returned to start of scan position, generally at an accelerated speed. Changes in magnification require different combinations of carriage/photoreceptor scan ratios, rescan speeds, and start of scan positions. In order to accomplish these various actions, and as is generally known in the prior art, a complicated system of electro-mechanical clutches and variable transmission ratios are required as exemplified in the referenced patent. These systems are difficult to design and, once designed for a specific system, are also difficult to modify. The components and their assemblies are costly and are subject to deterioration due to inevitable mechanical wear. Further, the acceleration parameters are restrained because of the slow response time due to the inertia of the carriage components.

The present invention is directed towards a scanning system wherein the translational motions of the scanning components are provided by a plurality of independently driven linear motors. Each of the linear motors cooperates with an associated carriage support structure upon which is mounted the optical element to be moved. Each motor is under the control of a master control system which synchronizes the scanning component movement with that of the photoreceptor and which, further, provides variable position and speed relationships among the scan components, the platen and the photoreceptor through a range of magnifications. The control system comprises a digital controller and amplifier for each linear motor and incorporates a feedback circuit to monitor motion acceleration velocity or position of the scan components.

More particularly, the invention relates to an optical imaging system for scanning an original document in an object plane and projecting an image at a selected magnification, onto a moving photoreceptor, the system comprising:

optical means for scanning and illuminating an original document to be copied, said scanning means including at least two moving scan components, each with a separate drive means to provide an independent rate of scan motion, said drive means including a linear electric motor, projection means for projecting a light image from said document onto said photoreceptor, and digital control means adapted to control the operation of said drive means in selected modes of operation.

According to a further aspect of the invention, the digital control means includes supervising control means to feed back acceleration, velocity and position signals of said moving scan components.

Figure 1:
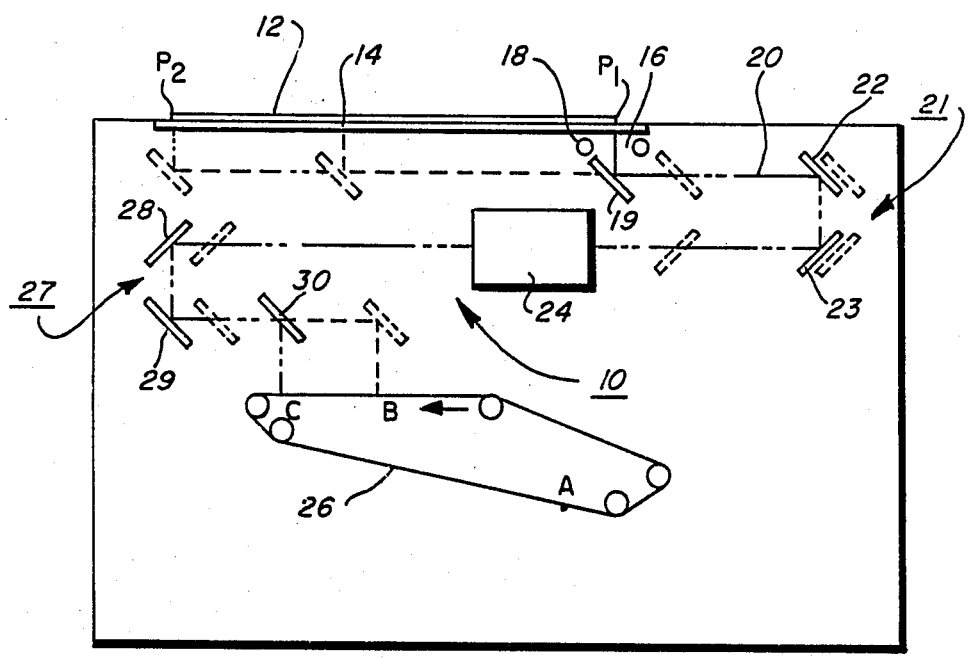
FIG. 1 is a schematic side view of a document imaging system in an electrophotographic reproduction machine which requires three separate motions of the optical scanning components.

Referring now to FIG. 1, there is shown, in side view a document imaging system which requires three scanning component assemblies to move in a lateral direction beneath a fixed document platen. The operation and requirements of this system are described in general terms below followed by a more detailed description of the drive mechanism and control circuitry (FIGS. 2-5) which provide separate, independent motions to each of the three scan components.

Referring to FIG. 1, there is shown a six mirror imaging system 10 which provides variable magnification reproduction of a document 12 placed on a transparent platen 14. An illumination scan assembly 16, comprising an enlongated lamp 18 and associated mirror 19, is moved at a first scanning speed $V_1$ in a plane parallel to that of platen 14 and from a right to left direction, in the figure. The document scan line image is incrementally reflected from mirror 19 along optical path 20. Corner mirror assembly 21, comprising mirrors 22 and 23 is moving at a second rate of speed, $V_2$ to maintain a constant object-to-lens distance. Assembly 21 reflects the image into lens 24 which, in turn, projects the image onto a photoreceptor belt 26 moving at a third rate of speed $V_3$. The image is reflected onto the belt via mirror assembly 27 comprising mirrors 28 and 29. Corner mirror assembly 27 is moved in a direction opposite to the travel of belt 26 and at a rate $V_4$ which accommodates travel along a chosen precession distance. Mirror 30 is moved at a rate $V_5$ in a direction opposite belt 26 travel to maintain a constant lens-to-image distance.

In operation, lens 24 is moved to the appropriate magnification position with the mirror components at the selected start-of-scan positions. As shown in FIG. 1, a portion AC of belt 26, representing a distance equal to document length $P_1$-$P_2$ will be exposed during the scan cycle with point C defining the image point of document point $P_1$. Illumination scan assembly 16 moves from right to left at a scan velocity $V_1$ greater than velocity $V_3$ of belt 26. Corner mirror assembly 21 moves at a second velocity $V_2$, which, at 1X magnification, is equal to $V_{\frac{1}{2}}$, to maintain a constant object-to-lens distance. A reflected image of the document, represented by a principal ray 20, is imaged through lens 24 and folded by corner mirror assembly 27 moving from left to right at velocity $V_4$. The image is then reflected onto belt 26 by mirror 30, moving at $V_5$ so that the image is precessed during scan a distance equal to BC. Point A reaches point B at the end-of-scan position. Thus, incremental portions of the document are illuminated and incremental images are reflected along the optical path 20 and projected by lens 24 as a flowing image onto belt 26 forming a latent image of the document on the belt. This latent image is subsequentially developed and transferred to a final copy medium by process steps well known in the art and described in detail in, for example, U.S. Pat. No. 4,318,610, whose contents are hereby incorporated by reference. Following a scan cycle, the movable optical components are returned to their start of scan positions at some regulation rescan speed R. If the system magnification is to be changed, a different combination of mirror-photoreceptor scan and rescan motions must be used as well as new start-of-scan position and lens positions.

Figure 2:
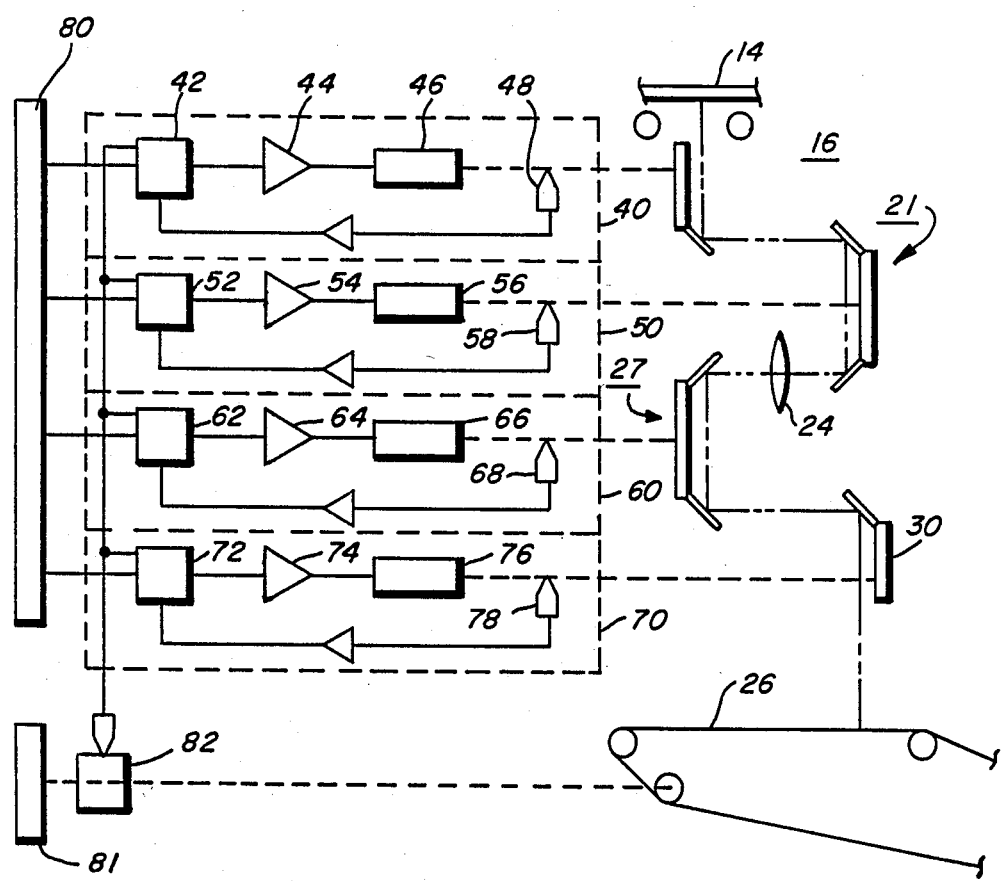
FIG. 2 is a block diagram of the control system of the invention for driving the scan components of FIG. 1.

According to the invention, all of these varied motions $V_1$, $V_2$, $V_4$, $V_5$ and R at different magnifications are provided by driving each scan component with its own independent, direct coupled, linear drive motor. Each drive motor is operated independently of the main photoreceptor drive motor and associated encoder. Each motion of the linear drive motor is separately controlled by means of an associated digital controller and amplifier which in turn, are under the control of a master supervisor controller. FIG. 2 represents a block diagram of the linear drive control system for these moving components of FIG. 1. As shown in FIG. 2, each moving component 16, 21, 27 and 30 has an associated control circuit 40, 50, 60, 70 respectively. Each control circuit is under the overall control of master supervisor control 80. Each control circuit generally comprises a digital controller 42, 52, 62, 72 amplifier 44, 54, 64, 74 linear motor 46, 56, 66, 76 and feedback path 48, 58, 68, 78. The operation of these circuits will be described in greater detail below. However, at this point, it may be useful to illustrate the manner in which the linear motor acts to create a lateral motion of the associated optical components.

Figure 3:
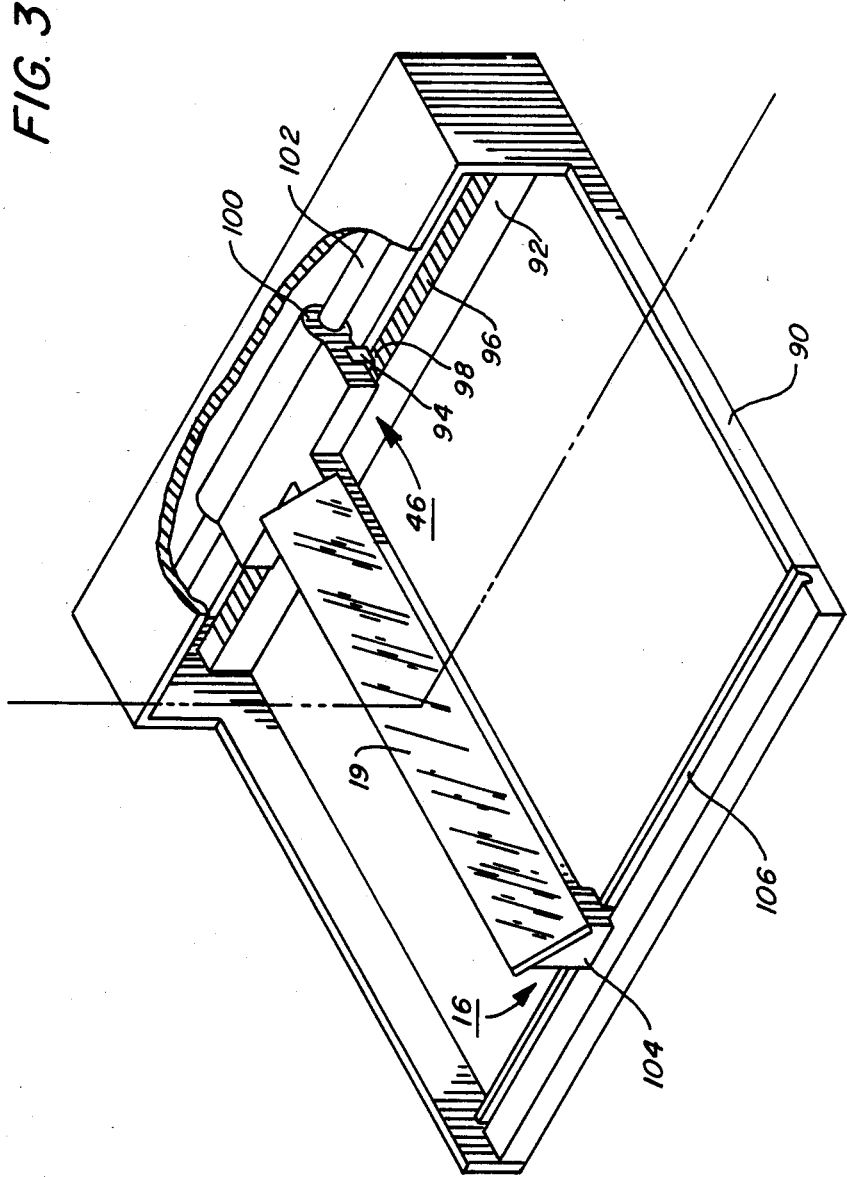
FIG. 3 shows the mechanical mounting arrangement for one of the scan component carriages.
Figure 4:
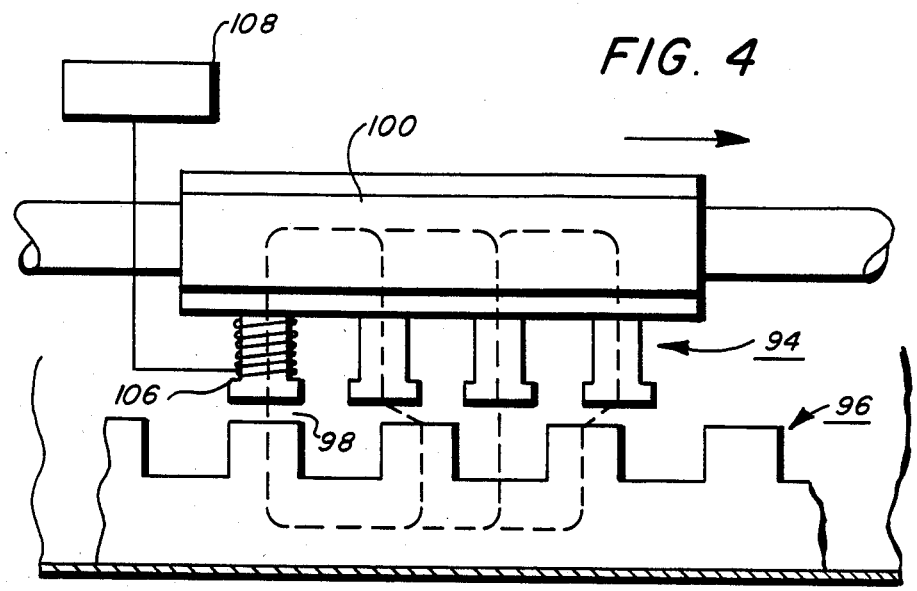
FIG. 4 is an enlarged view of the linear motor-carriage slider interface.

Referring to FIGS. 3 and 4, there is shown the mechanical mounting arrangement of mirror 19 on linear motor 46. As shown, motor 46, which can be a type LP-20R40A motor as supplied by Japan Servo (2-phase, 4-winding non-polarized) is firmly mounted on a machine frame 90 in a desired location. The motor includes a fixed stator 92 with teeth 96, and a sliding member 100 with teeth 94. The sliding member 100 is adapted to move along guide rail 102 positioned above stator 92 with an air gap 98 between sliding member teeth 94 and stator teeth 96. Ilumination scan assembly 16 is mounted on carriage 104 (only mirror 19 is shown in FIG. 3). The carriage is connected at the inboard end to slider 100 and is adapted to ride along a guide rail 106 at the outboard end.

As shown in a partial, enlarged side view of FIG. 4, slider 100 comprises a plurality of magnetic motion elements or teeth 94 and windings 106 along its entire length. The slider teeth 94 cooperate with the stator teeth 96 so as to close transverse magnetic flux paths across the gap 98. The slider 100 can then be moved in a lateral direction by applying a predetermined electrical pulse to windings 106 from an external power supply 108. The slider increment of movement is thus transferred to the illumination scan assembly 16 providing the desired scan motion.

In a similar fashion components 21, 27 and 30 are mounted on carriages (not shown) and driven by linear motors 56, 66, 76 respectively. The carriage movement is governed by sliders associated with the linear motors in the same manner as described for motor 46 above. Further control details describing initiation of various movements, carriage velocities and lengths are provided below.

Figure 5:
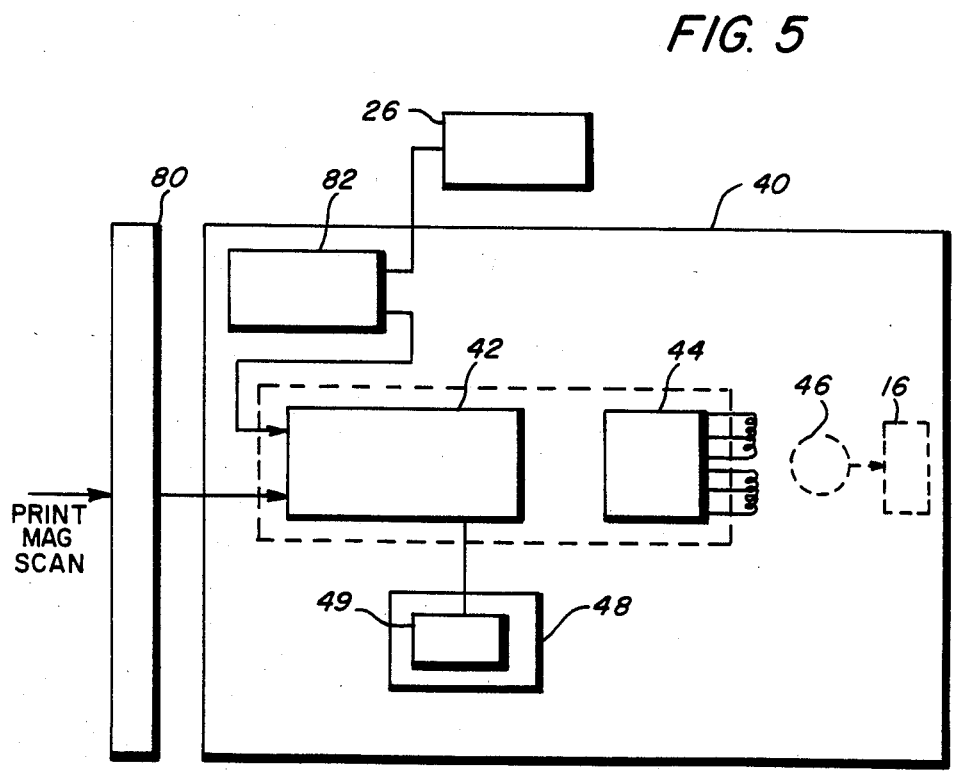
FIG. 5 is a block diagram of control elements for one of the scan assemblies.

Referring now to FIG. 5, there is shown a block diagram of the controls for illumination scan assembly 16 control circuit (40) associated with providing the motion for the assembly.

Supervisor control 80 has input signals arriving from the operator control panel of the particular machine. These signals correspond to print commands, magnification selection, start and stop and carriage position signals. The output signals to digital controller 42 thus respond to magnification, homing and start commands. Controller 42 has the primary functions of executing one homing cycle or one scan and retrace cycle and of sending appropriate drive signals to the linear motor 46 via amplifier 44. Each controller generates a digital representation of the position/time cycle for its associated carriage in response to the input magnification signals and to inputs from feedback circuit 48 and clock signals from clock generator 82. This digital representation comprises a sequence of digital power command signals which controls motor 46 via associated amplifier 44. The sequence of motor commands is controlled by the homing or scan commands sent from supervisor control 80.

Amplifier 44 acts on each drive signal and translates the digital signal into currents in the motor windings. Feedback circuit 48 includes accelerator 49 which is used to damp out velocity variations of motor 46. Motor 46 responds to the set of driving currents by seeking the corresponding equilibrium position. If the command decisions are updated at a sufficiently high rate (4000 times/sec), a smooth motor response is achieved.

Supervisor control 80 controls drive systems 50, 60 and 70 in a similar fashion.

Scan Drive Trajectory

Figure 6A:
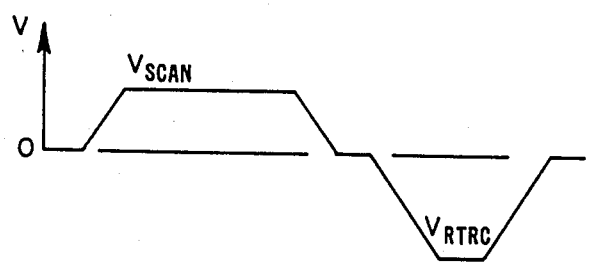
FIGS. 6a and 6b are scan drive motion plots for the scanning carriages.
Figure 6B:
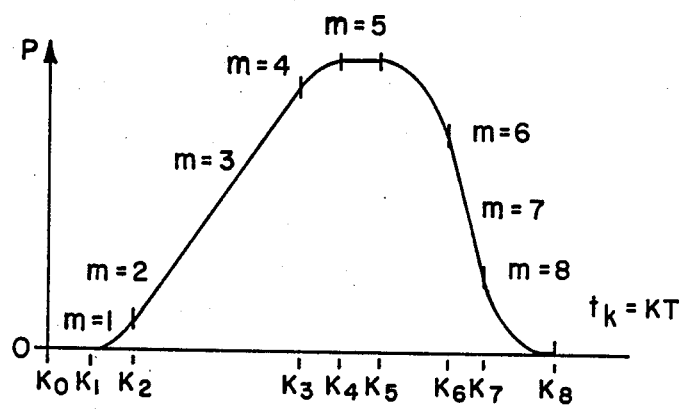

FIG. 6 shows the motion requirements for the scanning carriages in terms of position/time and velocity/time diagrams, with the nomenclature given in Table 1 with motion cycle terms provided in Table 2. Many of these terms are evaluated with respect to sampling time interval, discrete time, and discrete time index (clock) counts which, in turn, are used to design the digital controller. More information on these terms can be found in "Discrete-Time and Computer Control Systems", by James A. Cadzow and Hinrich R. Martens, published by Prentice Hall (1970).

A FORTRAN computer program for the above values is provided in Appendix A. The program includes a set of position, speed and acceleration control values to be used in the unit controllers for the step-by-step calculation of carriage position commands. A different set is needed for each carriage and magnification combination.

Digital Control

Carriage motion, according to one aspect the invention, is controlled in an incremental manner by advancing carriage position in unequal increments at equal time intervals. To acomplish this, a control algorithm was derived expressed as follows (see Table 1 for nomenclature).

$$P(k) = P(k-1) + delP(k-1) \quad (1)$$

$$delP(k) = delP(k-1) + aTT \quad (2)$$

with the starting value $$delP(k0) = V(k0) + aTT/2 \quad (3)$$

The same algorithm is used for all segments of the motion cycle. Typical drive requirements for scan illumination assembly are:
Scan speed—714 mm/sec
Rescan speed—1150 mm/sec
Acceleration—1.5 g Carriage motion may alternatively be controlled by advancing the carriage position in equal intervals at unequal time intervals upon generation of the appropriate algorithm.

TABLE 1

Scan Drive Nomenclature
Term [SI units]

| Typed Symbol | |
|---|---|
| t | time [s]. |
| k | sampling time index, $= 0, 1, 2, \ldots$ |
| P(k) | discrete time position value [m]. |
| V(k) | discrete time velocity value [m/s]. |
| m | control mode index, $= 1, 2, 3, \ldots, 8$. |
| km | value of k at end of mode m, $= k_1, \ldots k_8$. |
| t67 | retrace time interval [s]. |
| Assigned values: | |
| Vscan | scan velocity, $> 0$ [m/s]. |
| Vrtrc | retrace velocity, $< 0$ [m/s]. |
| a | acceleration value, $> 0$ [m/s/s]. |
| k0 | initial k-0. |
| T | sampling time interval [s]. |
| t01 | m=1 wait time interval [s]. |
| t23 | m=3 scan time interval [s]. |
| t45 | m=5 wait time interval [s]. |
| P(k0) | initial position [m]. |

TABLE 2

Expressions for Motion Cycle Terms

Segment $m = 1$, from $k = k_0$ to $k = k_1$
$k_1 = k_0 + t01/T$
$V(k) = 0$
$P(k) = P(k_0)$ Segment $m = 2$, from $k = k_1$ to $k = k_2$
$k_2 = k_1 + Vscan/aT$
$V(k) = V(k-1) + aT$
$P(k) = P(k-1) + V(k-1)T + aTT/2$ Segment $m = 3$, from $k = k_2$ to $k_3$
$k_3 = k_2 + t23/T$
$V(k) = Vscan$
$P(k) = P(k-1) + Vscan\, T$ Segment $m = 4$, from $k = k_3$ to $k_4$
$k_4 = k_3 + Vscan/aT$
$V(k) = V(k-1) - aT$
$P(k) = P(k-1) + V(k-1)T - aTT/2$ Segment $m = 5$, from $k = k_4$ to $k_5$
$k_5 = k_4 + t45/T$
$V(k) = 0$
$P(k) = P(k_4)$ Segment $m = 6$, from $k = k_5$ to $k_6$
$k_6 = k_5 + |Vrtrc|/aT$
$V(k) = V(k-1) - aT$
$P(k) = P(k-1) + V(k-1)T - aTT/2$ Segment $m = 7$, from $k = k_6$ to $k_7$
$t67 = \{2(P(k_2) - P(k_1)) + (P(k_3) - P(k_2)) - 2(P(k_6) - P(k_5))\}/|Vrtrc|$
$k_7 = k_6 + t67/T$
$V(k) = Vrtrc$
$P(k) = P(k-1) + Vrtrc\, T$ Segment $m = 8$, from $k = k_7$ to $k_8$
$k_8 = k_7 + |Vrtrc|/aT$
$V(k) = V(k-1) + aT$
$P(k) = P(k-1) + V(k-1)T + aTT/2$ The above discussion describes the operation of the invention in the context of moving scan carriages in fixed paths beneath a platen. The invention, however, is not to be limited solely to this configuration. The principle can be extended by those skilled in the art to provide linear motion to a scanning lens of the type as disclosed, for example, in U.S. Pat. No. 4,336,995 to a moving document/platen system or disclosed, for example, in U.S. Pat. No. 4,171,901 to combinations of moving optical elements and a moving platen/document as disclosed, for example, in U.S. Pat. No. 4,459,010. The following claims are intended to cover all such variations and modifications.

APPENDIX A

```
C
C-------------------------------------------------------------------
C    NOMENCLATURE
C
C    Assigned values:
C       VSCAN     scan speed |m/s~.
C       VRTRC     retrace speed |m/s~.
C       A         acceleration |m/s/s~.
C       TSCAN     scan time |s~.
C       TWAIT     intermode wait time at zero speed |s~.
C       PSTART    initial position |m~.
C       T         control sampling time |s~.
C       TZERO=0   initial time.
C       KZERO=0   initial control count.
C       VZERO=0   initial speed |m/s~.
C       XCYC=1.6E-3   motion per cycle |m~.
C       BPC       cyclic motion control word length |binary bits~.
C
```

```
C     Calculated control parameter values:
C        DPm            initial position incr for mode m |m¯.
C        DDPi                   speed    incr for mode m |m¯.
C        DKm            control count        for mode m |m¯.
C
C     Simulated values:
C        Ki             control count at event i.
C        ti             time at event i |sec¯.
C        Pi             correct position at event i |m¯.
C        PCMi           commanded position at event i |m¯.
C
C------------------------------------------------------------
      DOUBLEPRECISION         VSCAN
      DOUBLEPRECISION         VRTRC
      DOUBLEPRECISION         A
      DOUBLEPRECISION         TSCAN
      DOUBLEPRECISION         TWAIT
      DOUBLEPRECISION         PSTART
      DOUBLEPRECISION         T
      DOUBLEPRECISION         TZERO/0./
      INTEGER                 KZERO/0./
      DOUBLEPRECISION         VZERO/0./
      DOUBLEPRECISION         XCYC/1.6E-3/
      INTEGER                 BPC
C
      INTEGER                 I
      DOUBLEPRECISION         DELT
      DOUBLEPRECISION         TIME(0:8)
      INTEGER                 K(0:8)
      INTEGER                 DK(0:8)
      DOUBLEPRECISION         V(0:8)
      DOUBLEPRECISION         P(0:8)
      INTEGER                 M
      DOUBLEPRECISION         U
C
      DOUBLEPRECISION         ATT
      DOUBLEPRECISION         H ATT
      INTEGER                 KNDX
      DOUBLEPRECISION         DP(0:8)
      DOUBLEPRECISION         DDP(0:8)
      DOUBLEPRECISION         PCM(0:8)
C
      CHARACTER*16            DESCRP(8)
     .                    / 'stop and wait'
     .                    , 'accel to scan'
     .                    , 'scan'
     .                    , 'deccel to stop'
     .                    , 'stop and wait'
     .                    , 'accel to retrace'
     .                    , 'retrace'
     .                    , 'deccel to stop'
     .                    /
C
C     Time function:
      DOUBLEPRECISION         TT
      TT(I)    =TIME(I-1) +DELT
C
C     Count function:
      INTEGER                 KK
      KK(I)    =IDINT(TIME(I)/T +.5)
C
C     Count increment function:
      INTEGER                 DD
      DD(I)    =K(I) -K(I -1)
C
```

```
C    Position function:
        DOUBLEPRECISION             PP
        PP(I)     =P(I-1) +V(I-1)*DELT +.5*(V(I) -V(I-1))*DELT
C
C    Hexadecimal value functions:
        DOUBLEPRECISION             Q
        INTEGER                     NMAX/8Z 1000 0000/
        INTEGER                     LOBITS
        INTEGER                     HIBITS
        HIBITS(Q)=IDINT(            Q/NMAX)
        LOBITS(Q)=IDINT(Q -NMAX* DINT(Q/NMAX))
C
C    Two's complement hexadecimal value functions:
        INTEGER                     CLOBITS
        INTEGER                     CHIBITS
        INTEGER                     CARRY
        CLOBITS(Q) =INOT(LOBITS(Q)) +1
        CARRY(Q)   =CLOBITS(Q)/NMAX
        CHIBITS(Q) =INOT(HIBITS(Q)) +CARRY(Q)
C
C    Program ident:
        OUTPUT(108) ' ','JK118101   DEC 11 81 D.01'
       .        , 'Scan drive control simulation.'
       .        , ' '
       .        , 'Assigned values:'
       .        , '  VSCAN     scan speed |m/s¯.'
       .        , '  VRTRC     retrace speed, a - value |m/s¯.'
       .        , '  A         acceleration |m/s/s¯.'
       .        , '  TSCAN     scan time |s¯.'
       .        , '  TWAIT     intermode wait time at zero speed |s¯.'
       .        , '  PSTART    initial position |m¯.'
       .        , '  T         control sampling time |s¯.'
       .        , '  BPC       motion control word length |bin bits¯.'
       .        , '  XCYC=1.6E-3   motion per cycle |m¯.'
       .        , ' '
       .        , 'Calculated control parameter values:'
       .        , '  DPm       initial position incr for mode m |m¯.'
       .        , '  DDPi              speed    incr for mode m |m¯.'
       .        , '  DKm       control count         for mode m |m¯.'
       .        , ' '
       .        , 'Simulated values:'
       .        , '  Ki        control count at event i.'
       .        , '  ti        time at event i |sec¯.'
       .        , '  Pi        correct position at event i |m¯.'
       .        , '  PCMi      commanded position at event i |m¯.'
C
C    Repeat program execution:
        REPEAT 100,                 WHILE .TRUE.
C
C    Get user input:
        OUTPUT(108) ' '
       .        , 'Enter self ident assigned values,'
       .        , '* to go, break-key and QUIT to stop:'
C
        NAMELIST                    VSCAN
       .                          , VRTRC
       .                          , A
       .                          , TSCAN
       .                          , TWAIT
       .                          , PSTART
       .                          , T
       .                          , BPC
        INPUT(105)
        OUTPUT(108)                 VSCAN
       .                          , VRTRC
       .                          , A
```

```
             .                        , TSCAN
             .                        , TWAIT
             .                        , PSTART
             .                        , T
             .                        , TZERO
             .                        , KZERO
             .                        , VZERO
             .                        , BPC
             .                        , XCYC
C
C     Calculate true values for DK(i) and P(i):
C     Start mode 1:
C
      I          =0
      TIME(I)    =TZERO
      K(I)       =KZERO
      DK(I)      =0
      V(I)       =VZERO
      P(I)       =PSTART
C     End mode 1 and start mode 2:
C
      I          =1
      DELT       =TWAIT
      TIME(I)    =TT(I)
      K(I)       =KK(I)
      DK(I)      =DD(I)
      V(I)       =VZERO
      P(I)       =PSTART
C     End mode 2 and start mode 3:
C
      I          =2
      DELT       =DABS((VSCAN -V(1))/A)
      TIME(I)    =TT(I)
      K(I)       =KK(I)
      DK(I)      =DD(I)
      V(I)       =VSCAN
      P(I)       =PP(I)
C     End mode 3 and start mode 4:
C
      I          =3
      DELT       =TSCAN
      TIME(I)    =TT(I)
      K(I)       =KK(I)
      DK(I)      =DD(I)
      V(I)       =VSCAN
      P(I)       =PP(I)
C     End mode 4 and start mode 5:
C
      I          =4
      DELT       =DABS((VZERO -V(3))/A)
      TIME(I)    =TT(I)
      K(I)       =KK(I)
      DK(I)      =DD(I)
      V(I)       =VZERO
      P(I)       =PP(I)
C     End mode 5 and start mode 6:
C
      I          =5
      DELT       =TWAIT
      TIME(I)    =TT(I)
      K(I)       =KK(I)
      DK(I)      =DD(I)
      V(I)       =VZERO
      P(I)       =PP(I)
C     End mode 6 and start mode 7:
C
```

```
              I          =6
              DELT       =DABS((VRTRC -V(5))/A)
              TIME(I)    =TT(I)
              K(I)       =KK(I)
              DK(I)      =DD(I)
              V(I)       =VRTRC
              P(I)       =PP(I)
      C    End mode 7 and start mode 8:
      C
              I          =7
              DELT       =DABS( ( (P(6) -P(0)) -(P(5) -P(6)))/VRTRC )
              TIME(I)    =TT(I)
              K(I)       =KK(I)
              DK(I)      =DD(I)
              V(I)       =VRTRC
              P(I)       =PP(I)
      C    End mode 8:
      C
              I          =8
              DELT       =DABS((VZERO -V(7))/A)
              TIME(I)    =TT(I)
              K(I)       =KK(I)
              DK(I)      =DD(I)
              V(I)       =VZERO
              P(I)       =PP(I)
      C
      C    Acceleration increment constants:
              ATT        =A*T*T
              HATT       =ATT/2D0
      C
      C    Calculate and write length unit:
              U          =XCYC/(2D0)**((BPC-1))
              WRITE(108,05) U
      05      FORMAT(  T2,'|unit~ = XCYC/2**(BPC-1),  =',E10.4, ' |m~.' //)
      C
      C    Initial condition:
              I          =0
              PCM(I)     =PSTART
      C
      C    Set starting values of DP(m), and constants DDP(m), for each moc
              M          =1
              DP(M)      =0.
              DDP(M)     =0.
      C
              M          =2
              DP(M)      =DP(M-1) +HATT
              DDP(M)     =ATT
      C
              M          =3
              DP(M)      =VSCAN*T
              DDP(M)     =0.
      C
              M          =4
              DP(M)      =DP(M-1) -HATT
              DDP(M)     =-ATT
      C
              M          =5
              DP(M)      =0.
              DDP(M)     =0.
      C
              M          =6
              DP(M)      =DP(M-1) -HATT
              DDP(M)     =-ATT
      C
              M          =7
              DP(M)      =VRTRC*T
```

```
              DDP(M)     =0.
C
              M          =8
              DP(M)      =DP(M-1) +HATT
              DDP(M)     =ATT
C
C     Calculated control parameters:
        OUTPUT(108) 'Calculated control parameter values:'
        DO 60     M =1,8
                  WRITE(108,01) M,DESCRP(M)
                  Q =DABS( DP(M)/U)
                  IF( DP(M).GE.0.)
     o               WRITE(108,02)   DP(M),+Q, HIBITS(Q), LOBITS(Q)
                  IF( DP(M).LT.0.)
     o               WRITE(108,02)   DP(M),-Q,CHIBITS(Q),CLOBITS(Q)
                  Q =DABS(DDP(M)/U)
                  IF(DDP(M).GE.0.)
     o               WRITE(108,03)  DDP(M),+Q, HIBITS(Q), LOBITS(Q)
                  IF(DDP(M).LT.0.)
     o               WRITE(108,03)  DDP(M),-Q,CHIBITS(Q),CLOBITS(Q)
                  WRITE(108,04) DK(M),DK(M)
60      CONTINUE
        OUTPUT(108)    ' ',' '
C
01      FORMAT(  /T2,'Mode ',I,4X,A)
02      FORMAT(   T2,'DP'  ,T07,'=',T09,E11.4,T21,'|m⁻'
     o                    ,T25,'=',T26,E22.16,   T49,'dec'
     o                    ,T53,'=',T55,Z8,T63,Z7,T71,'hex',T75,'|unit⁻')
03      FORMAT(   T2,'DDP' ,T07,'=',T09,E11.4,T21,'|m⁻'
     o                    ,T25,'=',T26,E22.16,   T49,'dec'
     o                    ,T53,'=',T55,Z8,T63,Z7,T71,'hex',T75,'|unit⁻')
04      FORMAT(   T2,'DK'  ,T07,'=',T09,I11
     o                    ,T53,'=',T55,Z15         ,T71,'hex'            )
C
C    Simulate generation of command PCM values, mode by mode:
        DO 50     M =1,8
                  PCM(M)    =PCM(M-1)
C
                  DO 40    KNDX =1,DK(M)
                           PCM(M)   =PCM(M) +DP(M)
                           DP(M)    =DP(M)  +DDP(M)
40                CONTINUE
50      CONTINUE
C
C    Simulated control:
        WRITE(108,07)
07      FORMAT(
     o            T2,'Simulated control commands:'
     o          /T5,'K',T15,'t',T25,'P',T43,'PCM',T62,'PCM'
     o          /T13,'|s⁻',T23,'|m⁻',T43,'|m⁻',T59,'|unit⁻'
     o          /)
C
        DO 10     I =0,8
                  IF(I.GT.0)    WRITE(108,08)  I,DESCRP(I)
                  IF(PCM(I).GE.0.)
     o               WRITE(108,06)  K(I),TIME(I),P(I),PCM(I)
     o                   , HIBITS(DABS(PCM(I)/U)), LOBITS(DABS(PCM(I)/U
                  IF(PCM(I).LT.0.)
     o               WRITE(108,06)  K(I),TIME(I),P(I),PCM(I)
     o                   ,CHIBITS(DABS(PCM(I)/U)),CLOBITS(DABS(PCM(I),U
10      CONTINUE
08      FORMAT(T2,'Simulate mode ',I,T17,', ',A)
06      FORMAT(I5,F10.6,F10.6, T36, F10.6,T50,Z8,T58,Z7,T66,'hex';
C
        OUTPUT(108) ' ',' '
```

```
100    CONTINUE
C
C
C------------------------------------------------------------------
       END
```

What is claimed is:

1. In a document reproduction device, an optical imaging system for scanning an original document lying in an object plane and projecting an image at a selected magnification, onto a photosensitive image plane, the system comprising:

optical means for scanning and illuminating the original document to be copied, said scanning means including at least two moving scan components, each with a separate drive means to provide an independent rate of scan motion, said drive means including a linear electric motor, projection means for projecting a light image from said document onto said photosensitive image plane, and digital control means adapted to control the operation of said drive means in selected modes of operation.

2. The reproduction device of claim 1, wherein said digital control means includes supervising control means which operates upon print, magnification, and homing signals sent from the reproduction machine control panel to generate acceleration, velocity and position signals of said moving scan components.

3. The reproduction device of claim 1 wherein said digital control means provides movement of said drive means in unequal increments at equal time intervals.

4. The reproduction device of claim 1 wherein said digital control means provides movement of said drive means in equal increments at unequal time intervals.

5. The reproduction device of claim 2 wherein each moving scan component has an associated electronic circuit under the control of said supervising control circuit, said electronic circuit including:

a digital controller which responds to magnification, homing and start commands from the supervising control circuit to generate digital drive signals appropriate to the scan component being controlled;

means for amplifying the signals from said digital controller and applying them to the associated linear motor; and feedback means to damp out velocity variations of the linear motors.

* * * * *